US010558881B2

(12) United States Patent
Cho et al.

(10) Patent No.: US 10,558,881 B2
(45) Date of Patent: Feb. 11, 2020

(54) PARALLAX MINIMIZATION STITCHING METHOD AND APPARATUS USING CONTROL POINTS IN OVERLAPPING REGION

(71) Applicant: Electronics and Telecommunications Research Institute, Daejeon (KR)

(72) Inventors: Yong Ju Cho, Daejeon (KR); Soon-heung Jung, Daejeon (KR); Hyun Cheol Kim, Sejong-si (KR); Jeongil Seo, Daejeon (KR); Joo Myoung Seok, Daejeon (KR); Sangwoo Ahn, Daejeon (KR); Seung Jun Yang, Daejeon (KR); Injae Lee, Daejeon (KR); Hee Kyung Lee, Daejeon (KR); Seong Yong Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 257 days.

(21) Appl. No.: 15/662,616

(22) Filed: Jul. 28, 2017

(65) Prior Publication Data
US 2018/0060682 A1 Mar. 1, 2018

(30) Foreign Application Priority Data

Aug. 24, 2016 (KR) .................. 10-2016-0107905
Mar. 23, 2017 (KR) .................. 10-2017-0036889

(51) Int. Cl.
*G06K 9/36* (2006.01)
*G06K 9/20* (2006.01)
(Continued)

(52) U.S. Cl.
CPC ........... *G06K 9/20* (2013.01); *G06K 9/00771* (2013.01); *G06T 3/0081* (2013.01);
(Continued)

(58) Field of Classification Search
CPC ....... G06K 2009/2045; G06K 9/00771; G06K 9/20; G06T 3/0081; G06T 3/4038;
(Continued)

(56) References Cited

U.S. PATENT DOCUMENTS 6,389,179 B1 * 5/2002 Katayama ............. G06T 3/4038
348/36
7,957,581 B2 * 6/2011 Wu ......................... G06T 7/593
348/187
(Continued)

FOREIGN PATENT DOCUMENTS

KR           101333836 B1    11/2013
KR       1020160049639 A     5/2016

OTHER PUBLICATIONS

Hu, Jie et al., "Multi-Objective Content Preserving Warping for Image Stitching," International Conference of Multimedia Expo (ICME), Jun. 29-Jul. 3, 2015, IEEE.
(Continued)

*Primary Examiner* — Bhavesh M Mehta
*Assistant Examiner* — Ian L Lemieux
(74) *Attorney, Agent, or Firm* — William Park & Associates, Ltd.

(57) ABSTRACT

Provided is a parallax minimization stitching method and apparatus using control points in an overlapping region. A parallax minimization stitching method may include defining a plurality of control points in an overlapping region of a first image and a second image received from a plurality of cameras, performing a first geometric correction by applying a homography to the control points, defining a plurality of patches based on the control points, and performing a second geometric correction by mapping the patches.

12 Claims, 13 Drawing Sheets

(51) Int. Cl.
*H04N 9/097* (2006.01)
*G06T 3/00* (2006.01)
*H04N 13/225* (2018.01)
*G06K 9/00* (2006.01)
*H04N 5/262* (2006.01)
*H04N 5/232* (2006.01)
*G06T 3/40* (2006.01)
*H04N 13/239* (2018.01)
*H04N 13/00* (2018.01)

(52) U.S. Cl.
CPC ....... *H04N 5/23238* (2013.01); *H04N 5/2622* (2013.01); *H04N 9/097* (2013.01); *H04N 13/225* (2018.05); *G06K 2009/2045* (2013.01); *G06T 3/4038* (2013.01); *H04N 13/239* (2018.05); *H04N 2013/0088* (2013.01)

(58) Field of Classification Search
CPC .............. H04N 13/225; H04N 13/239; H04N 2013/0088; H04N 5/23238; H04N 5/2622; H04N 9/097
See application file for complete search history.

(56) References Cited

U.S. PATENT DOCUMENTS

| | | | |
|---|---|---|---|
| 8,345,961 B2 | 1/2013 | Li et al. | |
| 8,693,785 B2 | 4/2014 | Suk et al. | |
| 9,013,543 B1 | 4/2015 | Furukawa et al. | |
| 2010/0054579 A1* | 3/2010 | Okutomi | G01C 11/06 382/154 |
| 2011/0150101 A1* | 6/2011 | Liu | H04N 13/00 375/240.26 |
| 2011/0249153 A1* | 10/2011 | Hirooka | B60R 1/00 348/241 |
| 2012/0300979 A1* | 11/2012 | Pirchheim | G06T 7/246 382/103 |
| 2013/0071012 A1* | 3/2013 | Leichsenring | G06K 9/80 382/154 |
| 2013/0101263 A1* | 4/2013 | Morioka | G03B 35/08 386/224 |
| 2013/0250040 A1* | 9/2013 | Vitsnudel | H04N 5/23238 348/36 |
| 2014/0002439 A1* | 1/2014 | Lynch | G09B 29/007 345/419 |
| 2014/0184640 A1 | 7/2014 | Putraya et al. | |
| 2014/0240452 A1 | 8/2014 | Ki et al. | |
| 2016/0012304 A1* | 1/2016 | Mayle | G06K 9/46 382/209 |
| 2016/0088285 A1* | 3/2016 | Sadi | H04N 13/254 |
| 2016/0119541 A1* | 4/2016 | Alvarado-Moya | G06T 3/4038 348/38 |
| 2016/0295208 A1* | 10/2016 | Beall | G06T 7/80 |
| 2018/0205963 A1* | 7/2018 | Matei | H04N 19/46 |

OTHER PUBLICATIONS

Jiang, Wei et al., "Video Stitching with Spatial-Temporal Content-Preserving Warping," Computer Vision and Pattern Recognition (CVPR) Workshop, pp. 42-48, 2015.

Zhang, Fan et al., "Parallax-tolerant Image Stitching," Computer Vision and Pattern Recognition (CVPR) Conference, pp. 4321-4328, IEEE, Jun. 23-28, 2014.

\* cited by examiner

33

PARALLAX MINIMIZATION STITCHING METHOD AND APPARATUS USING CONTROL POINTS IN OVERLAPPING REGION

CROSS-REFERENCE TO RELATED APPLICATION(S)

This application claims the priority benefit of Korean Patent Application No. 10-2016-0107905 filed on Aug. 24, 2016, in the Korean Intellectual Property Office, and Korean Patent Application No. 10-2017-0036889 filed on Mar. 23, 2017, in the Korean Intellectual Property Office, the disclosure of which is incorporated herein by reference for all purposes.

BACKGROUND

1. Field

One or more example embodiments relate to a parallax minimization stitching method and apparatus using control points in an overlapping region.

2. Description of Related Art

In general, a plurality of cameras may photograph images such that a portion of one image overlaps another in order to generate a panorama image. The cameras may calculate homography information associated with a geometric correlation between neighboring photographed images by extracting a feature point from the overlapping portion of the photographed images and matching identical feature points. The homography information may indicate geometric correction information between neighboring images. A homography may be used for a geometric correction when planar stitching or cylindrical stitching is performed. However, pitch correction information, yaw correction information, roll correction information, and lens correction information may be used for a geometric correction when 360 VR (spherical) stitching is performed.

The calculated homography information may be used to perform stitching used for combining neighboring images. However, in a process of calculating the homography information, feature points may be extracted and matched with respect to all of the photographed images. Thus, a process of extracting and matching feature points may require a great amount of time and affect camera performance. In addition, an image quality may affect a stitched image quality. For example, when a number of feature points is insufficient due to quality of a night view image, a sky image, and a city center image, a basic amount of information is insufficient to calculate the homography information and match the feature points such that a relationship calculation may fail or incorrect homography information may be calculated due to a mapping issue. In addition, when a short-distance subject and a long-distance subject are simultaneously photographed, a stitched image may be distorted due to a parallax in case where the homography information is calculated based on a feature point of the short-distance subject and in case where the homography information is calculated based on a feature point of the long-distance subject.

When a short-distance object and a long-distance object are simultaneously present in an overlapping region or a distance between physical sensors of respective cameras is great, a parallax may occur and an image quality may deteriorate.

SUMMARY

An aspect provides a technology for minimizing a parallax of a plurality of images when a plurality of images obtained from a plurality of cameras are stitched.

Another aspect also provides a technology for performing a first geometric correction and a second geometric correction on a plurality of control points.

Still another aspect also provides a technology for updating a plurality of control points to a look-up table (LUT) based on a first geometric correction or a second geometric correction.

Further aspect also provides a technology for converting coordinates corresponding to a panorama image generated from a plurality of images based on depth information of a plurality of control points in an overlapping region.

According to an aspect, there is provided a parallax minimization stitching method including defining a plurality of control points in an overlapping region of a first image and a second image received from a plurality of cameras, performing a first geometric correction by applying a homography to the control points, defining a plurality of patches based on the control points, and performing a second geometric correction by mapping the patches.

The performing of the second geometric correction may include mapping the patches based on a cost function.

The cost function may be one of a correlation function, a mean squared error (MSE) function, a fast structure similarity (FSSIM) function, and a peak signal-to-noise ratio (PSNR) function.

The parallax minimization stitching method may further include converting coordinates of the control points on which the first geometric correction is performed based on depth information.

The converting of the coordinates may include calculating the depth information based on at least one of distances and directions of matched feature points among a plurality of feature points included in the overlapping region, a distance and a direction of a control point included in the overlapping region, alignment information of at least one object, feature similarity index (FSIM) information of the overlapping region, or high frequency information structure similarity index (HFI_SSIM) information of the overlapping region.

The converting of the coordinates may include verifying whether the control points correspond to a short distance or a long distance based on the depth information, lengthening a distance between control points corresponding to the short distance, and shortening a distance between control points corresponding to the long distance.

The parallax minimization stitching method may further include updating coordinates of the control points to a look-up table (LUT) based on the first geometric correction or the second geometric correction.

According to another aspect, there is provided a parallax minimization stitching apparatus including a receiver configured to receive a first image and a second image from a plurality of cameras, and a controller configured to define a plurality of control points in an overlapping region of the first image and the second image, perform a first geometric correction by applying a homography to the control points, define a plurality of patches based on the control points, and perform a second geometric correction by mapping the patches.

The controller may be configured to map the patches based on a cost function.

The cost function may be one of a correlation function, a mean squared error (MSE) function, a fast structure similarity (FSSIM) function, and a peak signal-to-noise ratio (PSNR) function.

The controller may be configured to convert coordinates of the control points on which the first geometric correction is performed based on depth information.

The controller may be configured to calculate the depth information based on at least one of distances and directions of matched feature points among a plurality of feature points included in the overlapping region, a distance and a direction of a control point included in the overlapping region, alignment information of at least one object, feature similarity index (FSIM) information of the overlapping region, or high frequency information structure similarity index (HFI_S-SIM) information of the overlapping region.

The controller may be configured to verify whether the control points correspond to a short distance or a long distance based on the depth information, lengthen a distance between control points corresponding to the short distance, and shorten a distance between feature points corresponding to the long distance.

The controller may be configured to update coordinates of the control points to a look-up table (LUT) based on the first geometric correction or the second geometric correction.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
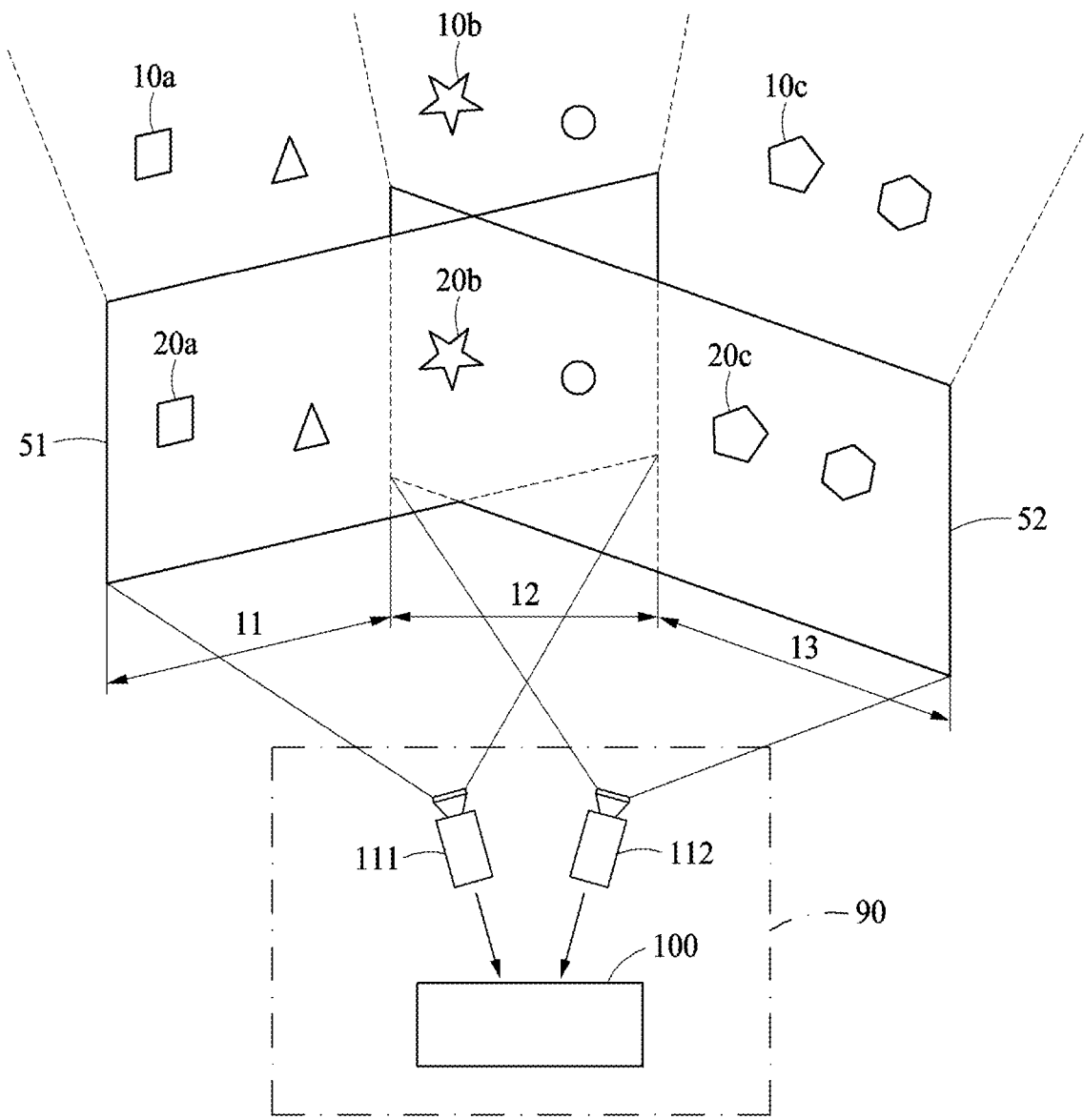
FIG. 1 illustrates a stitching operation of a stitching system according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions may not be described in detail because they would obscure the description with unnecessary detail.

The terminology used herein is for the purpose of describing the example embodiments only and is not intended to be limiting of the disclosure. As used herein, the singular forms "a," "an," and "the" are intended to include the plural forms as well, unless the context clearly indicates otherwise. It will be further understood that the terms "include/comprise" and/or "have," when used in this disclosure, specify the presence of stated features, integers, steps, operations, elements, components, or combinations thereof, but do not preclude the presence or addition of one or more other features, integers, steps, operations, elements, components, and/or groups thereof. In addition, the terms such as "unit," "-er (-or)," and "module" described in the specification refer to an element for performing at least one function or operation, and may be implemented in hardware, software, or the combination of hardware and software.

Terms such as first, second, A, B, (a), (b), and the like may be used herein to describe components. Each of these terminologies is not used to define an essence, order or sequence of a corresponding component but used to distinguish the corresponding component from other component (s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments are described in detail with reference to the accompanying drawings. Like reference numerals in the drawings denote like elements, and a known function or configuration will be omitted herein.

FIG. 1 illustrates a stitching operation of a stitching system according to an example embodiment.

Referring to FIG. 1, a stitching system 90 includes a first camera 111, a second camera 112, and a parallax minimization stitching apparatus 100.

Although FIG. 1 illustrates that the first camera 111 and the second camera 112 are provided outside the parallax minimization stitching apparatus 100, the first camera 111 and the second camera 112 are not limited thereto. The first camera 111 and the second camera 112 may be provided inside the parallax minimization stitching apparatus 100.

The parallax minimization stitching apparatus 100 may perform a stitching (or combining) operation by obtaining an image photographed by an outside camera or perform a stitching (or combining) operation by obtaining an image photographed by an inside camera.

The first camera 111 and the second camera 112 may photograph a plurality of objects 10a, 10b, and 10c and generate a plurality of images 51 and 52. Each of the images 51 and 52 may be one of a static image, a dynamic image, a two-dimensional (2D) image, and a three-dimensional (3D) image. To generate the images 51 and 52, the first camera 111 and the second camera 112 may be disposed radially.

The first camera 111 is disposed at a first position and the second camera 112 is disposed at a second position. Positions of the first camera 111 and the second camera 112 are relative to camera arrangements. For example, the second position is right when a first position is left, and the second position is left when the first position is right.

The first camera 111 and the second camera 112 may be disposed to have an identical central point to generate a panorama image. The first camera 111 and the second camera 112 may have an identical angle of view, an identical focal length, and an identical resolution.

The first camera 111 and the second camera 112 may rotate at fixed positions. That is, the first camera 111 and the second camera 112 may adjust ranges of regions 11, 12, and 13 that are photographed through a rotation operation. For example, at least one of a size of the overlapping region 12 or a position of the overlapping region 12 is adjusted by rotating at least one of the first camera 111 and the second camera 112. The first camera 111 and the second camera 112 may be manually rotated or may automatically rotate in response to a user input.

The first camera 111 and the second camera 112 may photograph the objects 10a, 10b, and 10c existing within a valid angle of view. Here, the first camera 111 and the second camera 112 may photograph a predetermined region of each of the objects 10a, 10b, and 10c by overlapping (or repeating) the predetermined regions.

For example, the first camera 111 generates the first image 51 by photographing the objects 10a and 10b included in an angle of view of the first camera 111. The second camera 112 may generate the second image 52 by photographing the objects 10b and 10c included in an angle of view of the second camera 112.

Because the first camera 111 and the second camera 112 photograph the objects 10a, 10b, and 10c by overlapping (or repeating) the objects 10a, 10b, and 10c by using a predetermined angle of view, the object 10b may be photographed by both the first camera 111 and the second camera 112. That is, the object 10b among the objects 10a, 10b, and 10c may be equally projected (or photographed) to a sensor of each of the first camera 111 and the second camera 112.

The first image 51 includes an object 20a included only in the first image 51 and an overlapping object 20b. The second image 52 includes an object 20c included only in the second image 52 and an overlapping object 20b. In addition, the first image 51 includes the region 11 included only in the first image 51 and the overlapping region 12. The second image 52 includes the region included only in the second image 52 and the overlapping region 12.

In addition, the first camera 111 and the second camera 112 may photograph at least one of the objects 10a, 10b, or 10c by using an appropriate overlapping angle of view.

The appropriate overlapping angle of view indicates a reference value of an angle of view that allows a feature point of the object 20b of the overlapping region 12 photographed by both the first camera 111 and the second camera 112 to be calculated. For example, when each of the first camera 111 and the second camera 112 is set to have an angle of view less than the appropriate overlapping angle of view, the overlapping region 12 may be relatively small such that a portion of the object 20b may be outside the overlapping region 12 and the parallax minimization stitching apparatus 100 may be unable to calculate the feature point of the object 20b.

The feature point may be referred to as points required for stitching (or combining) the neighboring images 51 and 52. In detail, the feature point may indicate a predetermined point on an identical object for verifying an identical point of the neighboring images 51 and 52. Thus, the appropriate overlapping angle of view of each of the first camera 111 and the second camera 112 may be set for calculating the feature point of the object 20b.

The parallax minimization stitching apparatus 100 may be an apparatus for performing stitching. The parallax minimization stitching apparatus 100 may be implemented as an electronic device. The electronic device may be implemented as a personal computer (PC) or a portable device.

The portable device may be implemented as a laptop computer, a mobile phone, a smartphone, a tablet PC, a mobile internet device (MID), a personal digital assistant (PDA), an enterprise digital assistant (EDA), a digital still camera, a digital video camera, a camcorder, a portable multimedia player (PMP), a personal navigation device or a portable navigation device (PND), a television (TV), a handheld game console, an e-book, a navigation device, or a smart device. The smart device may be implemented as a smartwatch or a smartband. The parallax minimization stitching apparatus 100 may generate the panorama image based on the images 51 and 52. The images 51 and 52 may include the first image 51 and the second image 52.

For example, the parallax minimization stitching apparatus 100 may generate the panorama image by stitching (or combining) the first image 51 and the second image 52.

The parallax minimization stitching apparatus 100 may define a plurality of control points in the overlapping region 12 of the first image 51 and the second image 52, and perform a first geometric correction by applying a homography to the control points. The first geometric correction may indicate a stitching correction. For example, the parallax minimization stitching apparatus 100 generates a polynomial surface that uses Bernstein polynomials based on the control points. The parallax minimization stitching apparatus 100 may generate a Bezier surface as an example of the polynomial surface. The parallax minimization stitching apparatus 100 may change a shape and a curvature of the Bezier surface by changing positions of the control points.

The parallax minimization stitching apparatus 100 may define the control points based on a preset division value in the overlapping region 12. For example, the parallax minimization stitching apparatus 100 defines 32×18 control points by dividing the overlapping region 12 in 1920×1080 pixels based on the preset division value corresponding to 60. The parallax minimization stitching apparatus 100 may generate an image in real time at 12K×2K @ 60 fps by allowing the first image 51 and the second image 52 to be associated with (related to) Cartesian coordinates of the panorama image.

Also, the parallax minimization stitching apparatus 100 may define a plurality of patches based on the control points, and perform the second geometric correction by mapping the patches. The second geometric correction may indicate a parallax minimization correction.

The parallax minimization stitching apparatus 100 may update coordinates of the control points to a look-up table (LUT) based on the first geometric correction or the second geometric correction.

That is, the parallax minimization stitching apparatus 100 may detect a parallax issue caused due to differences between pieces of depth information of the object 20b of the first image 51 and the second image 52. The parallax minimization stitching apparatus 100 may be used as a measuring tool that minimizes the parallax.

Although FIG. 1 illustrates that the first camera 111 and the second camera 112 are provided for ease of description, n cameras may be provided and thus, n positions may also exist. Here, n is an integer greater than or equal to 1. An n-th camera at an n-th position may be named based on relative arrangements (or positions) of n cameras.

Regardless of a number of cameras, for example, one camera or a plurality of cameras, the parallax minimization stitching apparatus 100 may generate the panorama image using the plurality of images.

Hereinafter, detailed description of an operation in which the parallax minimization stitching apparatus 100 performs stitching to minimize the parallax will be provided in detail.

Figure 2:
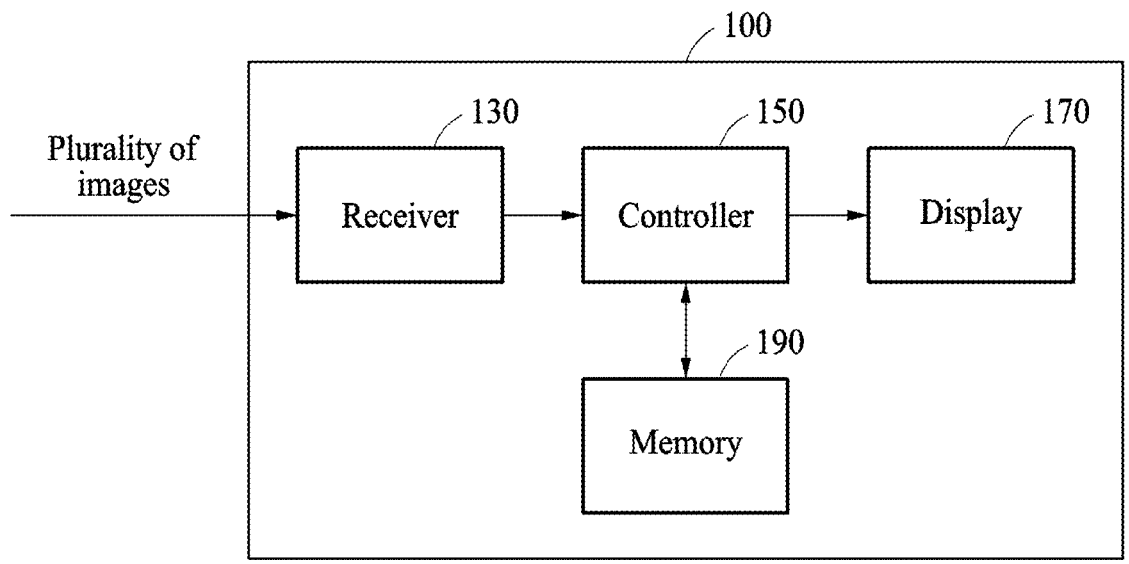
FIG. 2 is a block diagram illustrating a parallax minimization stitching apparatus according to an example embodiment.
Figure 3A:
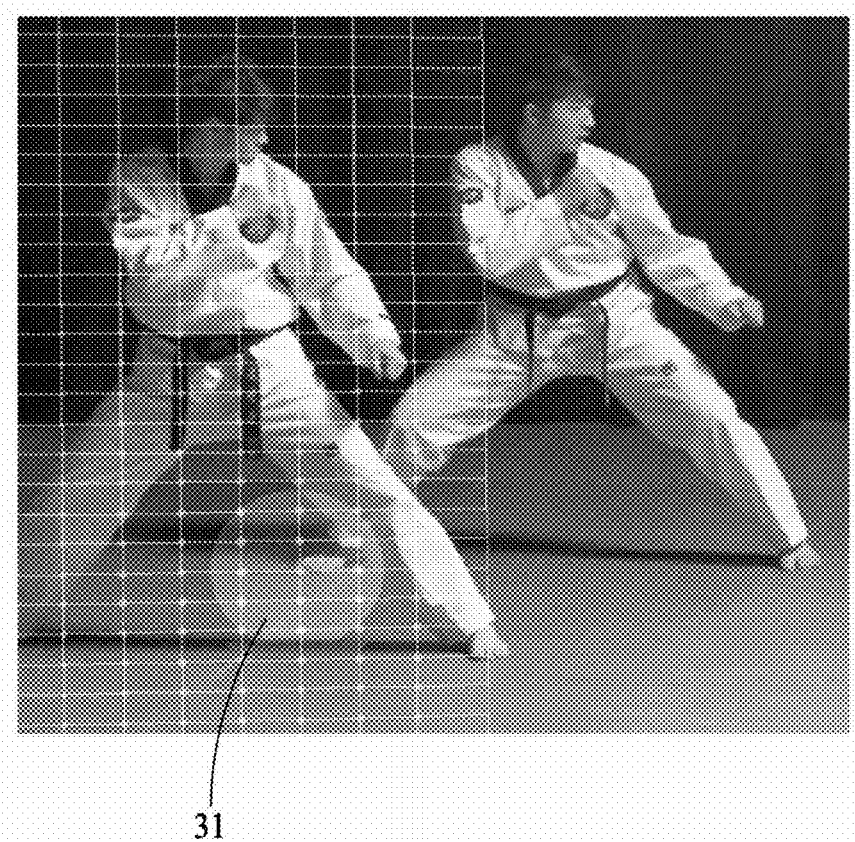
FIG. 3A illustrates a plurality of control points in a first image according to an example embodiment.
Figure 3B:
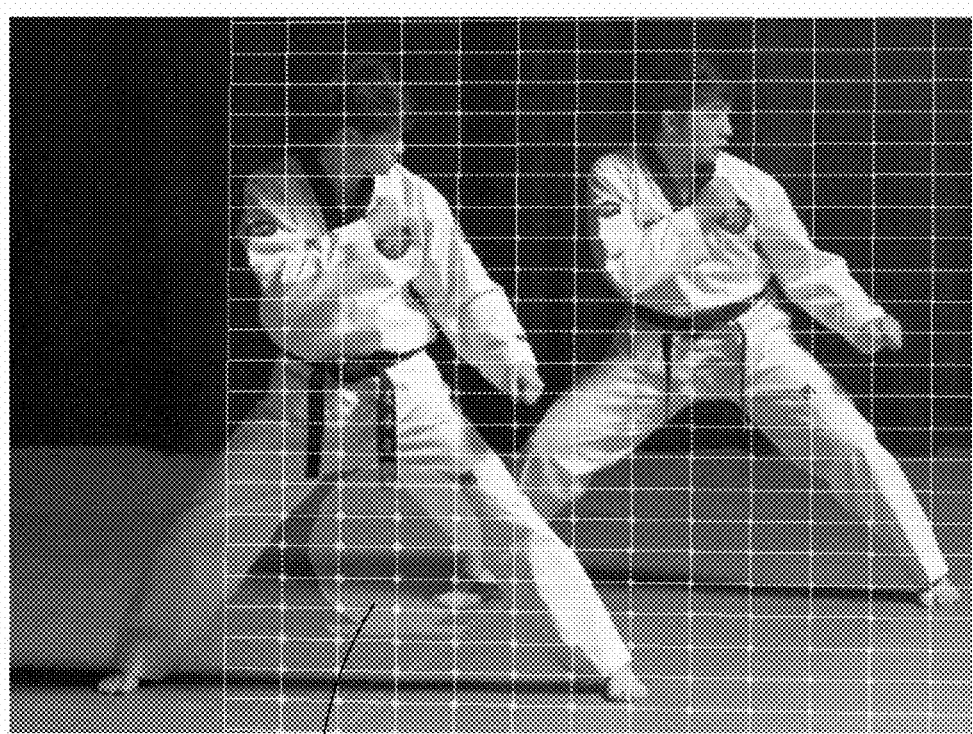
FIG. 3B illustrates a plurality of control points in a second image according to an example embodiment.
Figure 4:
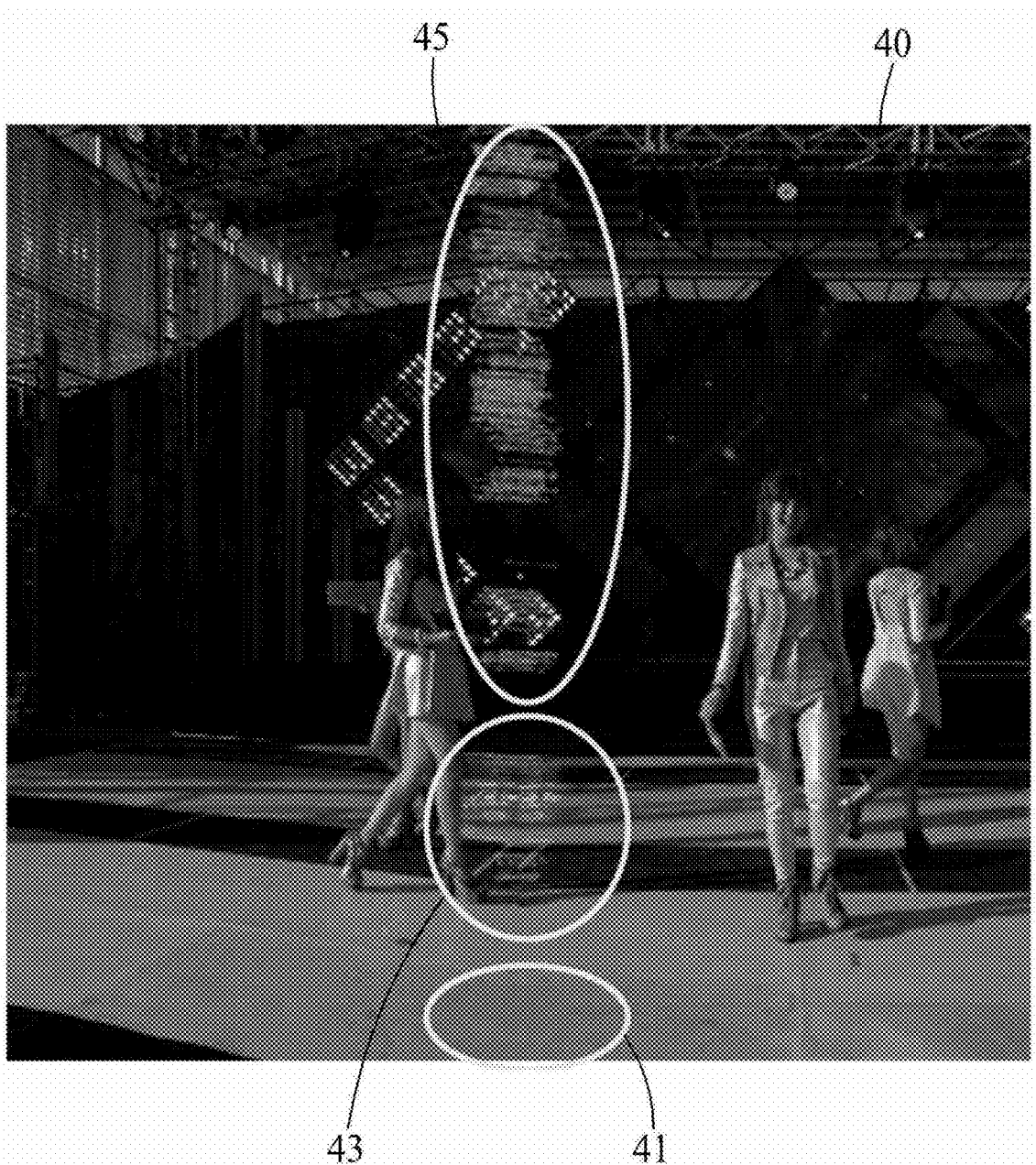
FIG. 4 illustrates an operation of calculating depth information by a controller according to an example embodiment.

FIG. 2 is a block diagram illustrating a parallax minimization stitching apparatus according to an example embodiment, FIG. 3A illustrates a plurality of control points in a first image according to an example embodiment, FIG. 3B illustrates a plurality of control points in a second image according to an example embodiment, and FIG. 4 illustrates an operation of calculating depth information by a controller according to an example embodiment.

Referring to FIGS. 1 through 4, the parallax minimization stitching apparatus 100 includes a receiver 130, a controller 150, a display 170, and a memory 190.

The receiver 130 receives the images 51 and 52 from the first camera 111 and the second camera 112. The receiver 130 may receive at least one image from the first camera 111 and the second camera 112 through at least one of a wired communication or a wireless communication network.

For example, the wired communication may be a cable communication or a communication using a wired local area network (LAN) terminal and a universal serial bus (USB) terminal, for example, USB 2.0 and USB 3.0. The wireless communication network may be an internet communication network, an intranet, Blue-tooth, a LAN, a wireless local area network (WLAN), or Wi-Fi established on an Institute of Electrical and Electronics Engineers (IEEE) 802.11 standard.

The controller 150 controls a general operation of the parallax minimization stitching apparatus 100. That is, the controller 150 controls the receiver 130, the display 170, and the memory 190.

The controller 150 generates a panorama image by performing stitching (or combining) to minimize a parallax of the images 51 and 52. For example, the controller 150 may perform at least one of an operation of extracting feature points from the images 51 and 52, an operation of calculating a homography of the images 51 and 52 based on the feature points, an operation of defining a plurality of control points, an operation of performing a first geometric correction and a second geometric correction on the control points, an operation of estimating depth information of the overlapping region 12, an operation of estimating a parallax of the overlapping region 12, an operation of extracting a plurality of patches based on the control points, an operation of performing the second geometric correction on the control points, or an operation of performing stitching on the images 51 and 52.

The controller 150 may be implemented as a printed circuit board (PCB), for example, a motherboard, an integrated circuit (IC), or a system on chip (SoC). For example, the controller 150 is an application processor.

The controller 150 sets a feature point extraction region on the images 51 and 52. The feature point extraction region may be a region from which a feature point is to be extracted. For example, the feature point extraction region is a neighboring region that is the overlapping region 12 of the images 51 and 52 or a region that is set in response to a user input.

The controller 150 extracts (or defines) a feature point from at least one object included in the feature point extraction region. For example, in response to the feature point extraction region being the overlapping region 12 of the first image 51 and the second image 52, the controller 150 may extract a feature point from the object 20b included in the overlapping region 12. Thus, in response to the feature point extraction region being the overlapping region 12 of the first image 51 and the second image 52, the controller 150 may perform processing quickly by using a relatively small amount of resources, because the feature point is extracted from a limited region. The feature point may be a set including at least one point configuring an object.

The controller 150 may generate at least one of homography information through at least one feature point extracted from the first image 51 and the second image 52, and information for the stitching (or combining) operation. Here, the controller 150 may calculate the homography information using a combination line that connects corresponding feature points in each of the first image 51 and the second image 52. The homography information may be associated with a relationship between two plane surfaces extracted from the first image 51 and the second image 52.

Also, the controller 150 may define the control points based on a preset division value in the overlapping region 12. A plurality of control points defined in the first image 51 by the controller 150 are illustrated in FIG. 3A, and a plurality of control points defined in the second image 52 by the controller 150 are illustrated in FIG. 3B. The controller 150 may perform a geometric correction by moving positions (coordinates) of a plurality of control points 31 and 33 in the overlapping region 12.

The controller 150 may perform the first geometric correction on the control points based on the homography information. The first geometric correction may indicate a stitching correction. That is, the controller 150 may perform the first geometric correction by applying the homography information to the control points. Based on a result of the first geometric correction, the positions (coordinates) of the control points may be moved (converted).

The controller 150 may update the coordinates of the control points to a look-up table (LUT). The controller 150 may update the coordinates of the control points to the LUT whenever the geometric correction is performed.

The controller 150 may generate a stitched image 40 by performing the first geometric correction. The stitched image 40 includes a plurality of feature points 41, 43, and 45.

The controller 150 may estimate depth information of the stitched image 40 and a parallax based on different pieces of depth information based on the feature points 41, 43, and 45. The depth information may be associated with relative depths of the feature points included in the overlapping region 12, for example, the stitched image 40.

For example, the controller 150 may determine a short distance or a long distance based on a number of the feature points 41, 43, and 45 included in the object of the stitched image 40. As a number of feature points included in the stitched image 40 increases in an order of a first region including the feature point 41, a second region including the feature point 43, and a third region including the feature point 45, depths of the first region, the second region, and the third region may increase in the order of the first region, the second region, and the third region. That is, a distance between a camera and each of the first region, the second region, and the third region may increase in the order of the first region, the second region, and the third region. The controller 150 may estimate a parallax of the stitched image 40 based on the number of the feature points 41, 43, and 45.

The parallax minimization stitching apparatus 100 may include a depth camera. The controller 150 may obtain the depth information from a depth image obtained by the depth camera.

The controller 150 may perform stitching (or combining) on the first image 51 and the second image 52 based on the depth information. The stitching (or combining) performed based on the depth information may indicate two-dimensional (2D) template arrangement. For example, the controller 150 may perform stitching (or combining) based on a distance between an object and a focal point.

The controller 150 may estimate the depth information and the parallax based on the depth information based on at least one of the homography information, the information for the stitching (or combining) operation, distances and directions of matched feature points in the overlapping region 12, a distance and a direction of a control point in the overlapping region 12, alignment information of the at least one object in the overlapping region 12, feature similarity index (FSIM) information of the overlapping region 12, or high frequency information structure similarity index (HFI_SSIM) information of the overlapping region 12.

The alignment information of the object may be associated with an arrangement state of the object 20b included in the first image 51 and the object 20 b included in the second image 52. The alignment information of the object may be generated based on at least one of the HFI_SSIM information, the FSIM information, or parallax information of the images 51 and 52. The controller 150 may verify whether feature points of the at least one object in the overlapping region 12 are well matched based on at least one of the HFI_SSIM information, the FSIM information, or the parallax information.

The FSIM information may be associated with an index value indicating a feature similarity between the images 51 and 52, or may be associated with a value used to assess quality of the panorama image.

The HFI_SSIM information may be SSIM information based on high frequency information (HFI) of the images 51 and 52. The HFI_SSIM information and the SSIM information may indicate a structural similarity between the images 51 and 52 and may be associated with a value used to assess geometric quality of the panorama image obtained by performing stitching (or combining) on the images.

The controller may obtain the HFI_SSIM information from the images 51 and 52 using an A'Trous filter. The controller 150 may separate low frequency information (LFI) and high frequency information (HFI) of the images 51 and 52 using the A'Trous filter. The A'Trous filter may be a Starck Murtagh filter.

The matched feature points may be feature points in the first image 51 matched to feature points in the second image 52. For example, the controller 150 may match corresponding feature points by extracting feature points in the overlapping region 12 from the first image 51, and extracting feature points in the overlapping region 12 from the second image 52. The controller 150 may estimate the depth information of a plurality of feature points and the parallax based on the depth information using a correlation of the matched feature points.

The controller 150 may perform stitching by minimizing the parallax of the first image 51 and the second image 52 based on the depth information.

The controller 150 may minimize the parallax by converting panorama coordinates corresponding to the panorama image generated from the images 51 and 52 based on the depth information. For example, the controller 150 may convert a panorama image surface of the panorama image into a nonlinear image surface. Detailed description of an operation in which the controller 150 converts the panorama coordinates will be provided with reference to FIG. 5.

The controller 150 may define a plurality of patches based on a plurality of control points and generate a stitched panorama image by performing a second geometric correction based on the patches. The second geometric correction may indicate a parallax minimization correction. The patches may be polygonal.

The controller 150 may map the patches based on a cost function. The cost function may be one of a correlation function, a mean squared error (MSE) function, a fast structure similarity (FSSIM) function, and a peak signal-to-noise ratio (PSNR) function.

The display 170 displays the stitched panorama image. The display 170 may be implemented as a liquid crystal display (LCD). The display 170 may be implemented as a touch screen, a thin film transistor-liquid crystal display (TFT_LCD), a liquid emitting diode (LED) display, an organic liquid emitting diode (OLED) display, an active matrix organic liquid emitting diode (AMOLED) display, or a flexible display.

The memory 190 stores at least one of feature points of the images 51 and 52, the FSIM information, or the HFI_SSIM information.

The controller 150 may assess the geometric quality of the stitched panorama image based on at least one of the feature points of the images 51 and 52, the FSIM information, or the HFI_SSIM information stored in the memory 190. The controller 150 may transmit, to the display 170, an image of which the FISM information or the HFI_SSIM information exceeds a threshold.

Figure 5:
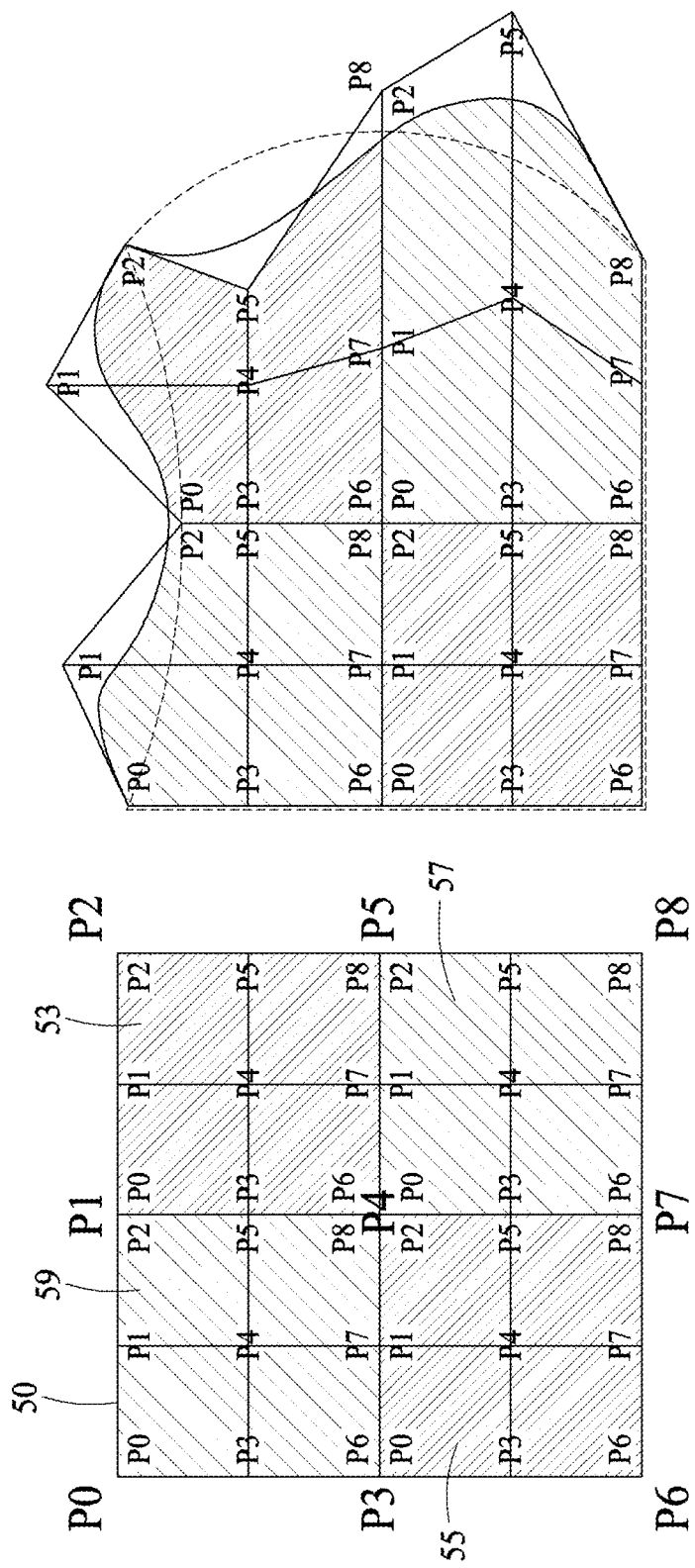
FIG. 5 illustrates an operation of converting coordinates by a controller according to an example embodiment.

FIG. 5 illustrates an operation of converting coordinates by a controller according to an example embodiment. Referring to FIG. 5, the controller 150 may perform stitching (or combining) on the images 51 and 52 based on a plurality of control points. That is, the controller 150 may perform stitching (or combining) on the images 51 and 52 to generate a panorama image based on calculated homography information.

The controller 150 may convert (or change) corresponding panorama coordinates to generate the panorama image. A region in which coordinates are to be converted (or changed) may be the overlapping region 12. An amount of data to be processed may be reduced by converting (or changing) coordinates of the overlapping region 12 instead of converting (or changing) coordinates of entire regions of the images 51 and 52. A processing amount performed by the controller 150 may be reduced such that a processing speed of the parallax minimization stitching apparatus 100 may increase.

The controller 150 may convert (or change) coordinates of the control points corresponding to depth information to minimize a parallax of the images 51 and 52 based on the depth information. For example, when the controller 150 estimates the depth information based on feature points, the controller 150 may convert (or change) the coordinates of the control points corresponding to the feature points.

The controller 150 may verify whether the control points correspond to a short distance or a long distance based on the depth information. The controller 150 may modify (or change) a distance between feature points corresponding to the short distance among feature points and modify (or change) a distance between feature points corresponding to the long distance.

An operation of modifying (or changing) the distances between the control points by the controller 150 may include an operation of lengthening or shortening the distances between the feature points. For example, based on the depth information, the controller 150 may lengthen the distance between the feature points corresponding to a long-distance object based on verification that an object is positioned at a short distance away and shorten the distance between the feature points corresponding to a long-distance object based on verification that the object is positioned at a long distance away.

In addition, the controller 150 may shorten or lengthen a gap (or distance) between pixels corresponding to the control points. Thus, a gap (or distance) between pixels in the overlapping region 12 in which the short-distance object is positioned may be lengthened or a gap (or distance) between pixels in the overlapping region 12 in which the long-distance object is positioned may be shortened.

Also, the controller 150 may convert (or change) the panorama coordinates by performing Bezier transformation on the images 51 and 52.

The controller 150 may generate a plurality of control points Px on a Bezier patch 50 to perform Bezier transformation. The overlapping region 12 of the images 51 and 52 may correspond to the Bezier patch 50. For example, the Bezier patch 50 may include nine control points P0 through P8. The nine control points P0 through P8 may include edge control points P1, P3, P5, and P7, corner control points P0, P2, P6, and P8, and a center control point P4.

The Bezier patch 50 may include a plurality of subdivision patches 53, 55, 57, and 59. That is, the Bezier patch 50 includes the control points P0 through P8 and each of the subdivision patches 53, 55, 57, and 59 may include a plurality of control points p0 through p8.

The controller 150 may convert (or change) panorama coordinates using at least one of the control points Px and px. For example, when the controller 150 moves the control points Px and px, a panorama plane may be also converted (or changed).

The controller 150 may modify (or change) a position of at least one of the control points Px and px based on the depth information. The controller 150 may convert the panorama coordinates by modifying (or changing) a position of at least one of the control points Px and px and perform a stitching (or combining) operation on a plurality of images.

For example, the controller 150 may verify that a distance between control points p0 and p1 of the subdivision patch 59 is a long distance. Thus, the controller 150 may lengthen the distance (or gap) between the control points p0 and p1. Similarly, the controller 150 may lengthen a distance (or gap) between control points p1 and p2.

Based on a result of the controller 150 converting (or changing) the panorama coordinates, a plane of the overlapping region 12 may be converted into the nonlinear image surface.

Although it is described that an operation in which the controller 150 converts coordinates is based on Bezier transformation, the operation in which the controller 150 converts coordinates is not limited thereto. The controller 150 may convert (or change) the panorama coordinates based on other methods, for example, a Gaussian method, of converting the coordinates in addition to Bezier transformation.

Figure 6:
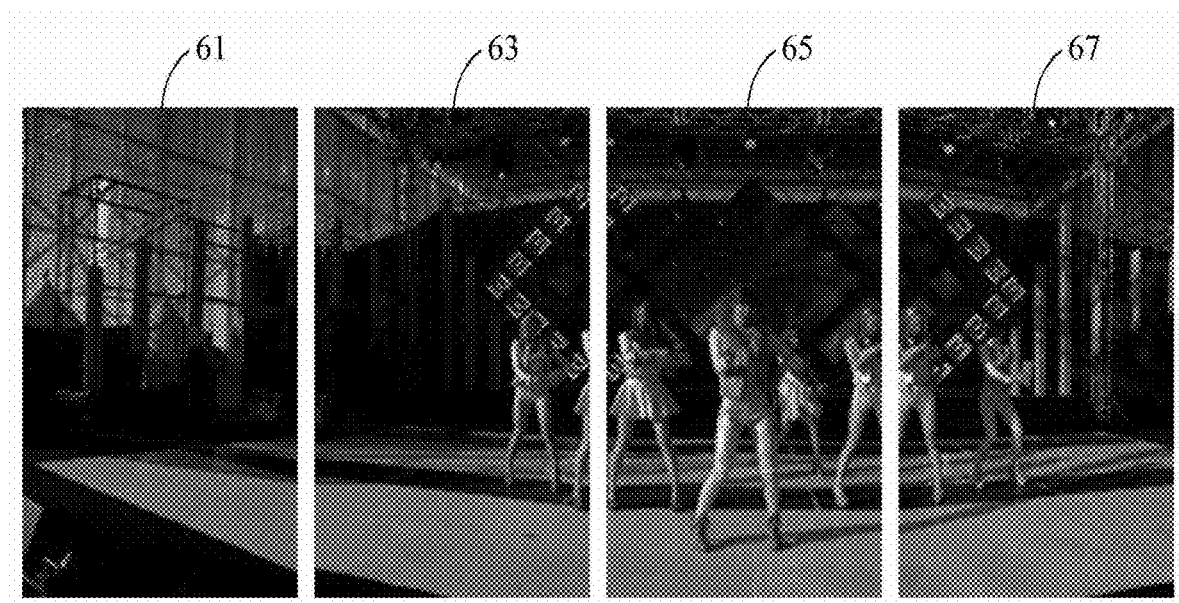
FIG. 6 illustrates a plurality of images received by a receiver according to an example embodiment.
Figure 7:
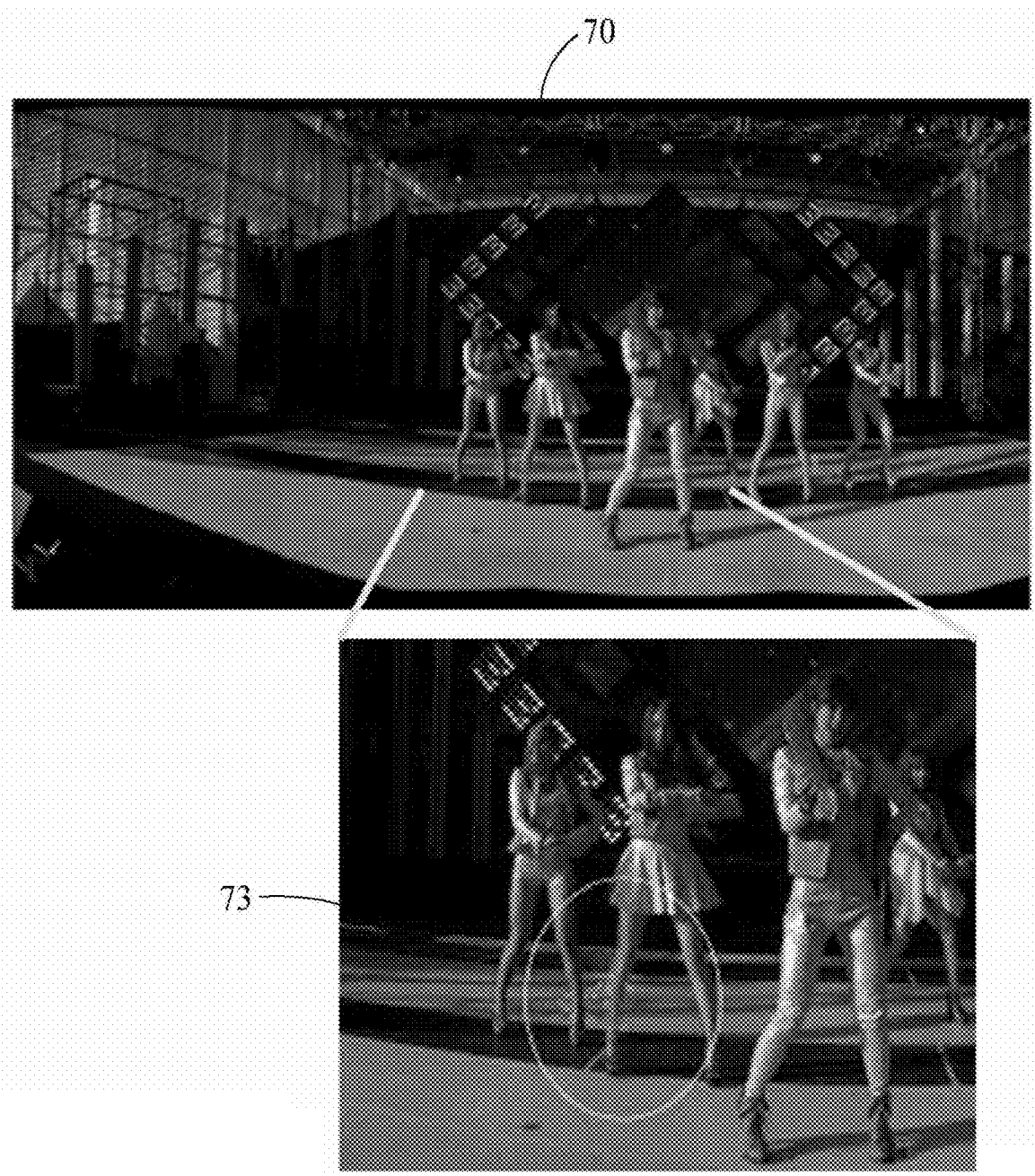
FIG. 7 illustrates a parallax caused in an overlapping region when a controller performs a first geometric correction on a plurality of images according to an example embodiment.
Figure 8:
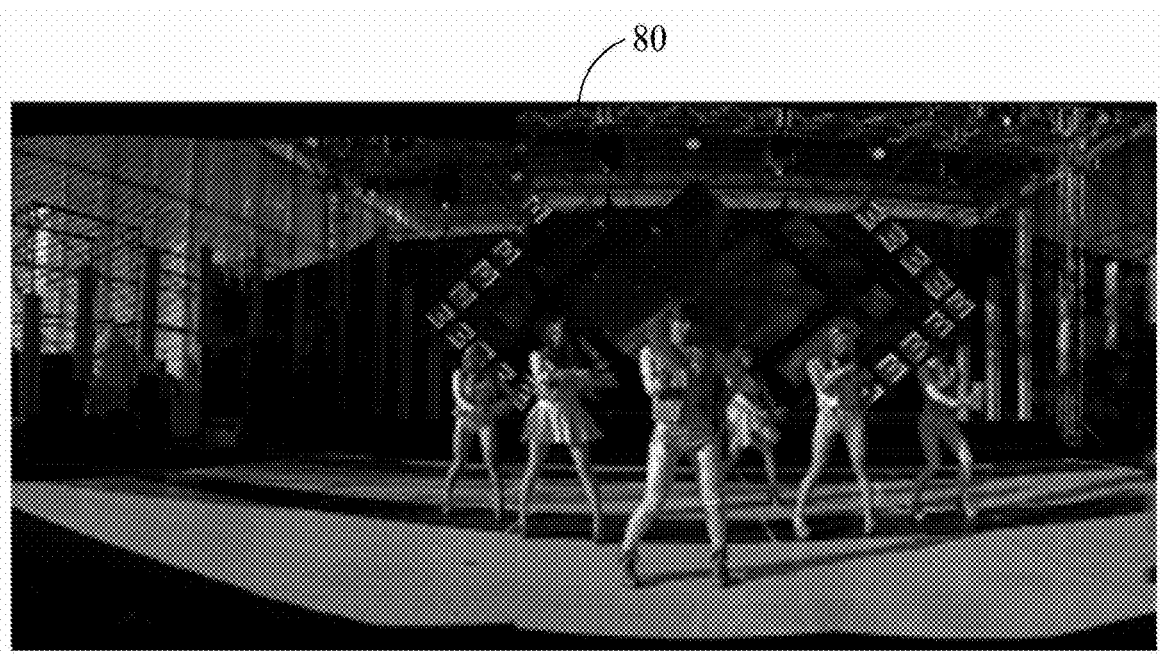
FIG. 8 illustrates a result of which a controller performs a first geometric correction and a second geometric correction on a plurality of control points in an overlapping region according to an example embodiment.

FIGS. 6 through 8 each illustrate an example of a result of which a parallax optimization stitching apparatus performs stitching (or combining) on a plurality of images.

FIG. 6 illustrates a plurality of images received by a receiver, FIG. 7 illustrates that a parallax occurs in an overlapping region when a controller performs a first geometric correction on a plurality of images, and FIG. 8 illustrates a result of which a controller performs a first geometric correction and a second geometric correction on a plurality of control points in an overlapping region.

Referring to FIGS. 6 through 8, the receiver 130 receives a plurality of images 61, 63, 65, and 67 photographed by a plurality of cameras.

The cameras may photograph objects having overlapping angles of view and generate the images 61, 63, 65, and 67 having regions overlapping with neighboring images.

When the images 61, 63, 65, and 67 are stitched (or combined) in a simple manner, an image 70 is obtained. Because image starting points of the cameras are not identical, a ghost effect may be present in, for example, a parallax region in an image 73. The parallax may occur when a short-distance object and a long-distance object are concurrently present in an overlapping region.

To minimize the parallax, the controller 150 may convert (or change) panorama coordinates by performing the first geometric correction and the second geometric correction in the overlapping region.

In detail, the controller 150 may define a plurality of control points in at least one of overlapping regions of the images 61, 63, 65, and 67, and perform the first geometric correction by applying a homography to the control points. The controller 150 may define the control points based on a preset division value.

The controller 150 may convert coordinates of the control points on which the first geometric correction is performed based on depth information. The controller 150 may estimate the depth information and a parallax based on the depth information, based on at least one of homography information, information for the stitching (or combining) operation, distances and directions of matched feature points in the overlapping region, a distance and a direction of a control point included in the overlapping region, alignment information of at least one object, feature similarity index (FSIM) information of the overlapping region, or high frequency information structure similarity index (HFI_SSIM) information of the overlapping region.

In addition, the controller 150 may generate a panorama image 80 by defining a plurality of patches based on the control points and performing the second geometric correction by mapping the patches. Here, the controller 150 may map the patches based on a cost function. The cost function may be one of a correlation function, a mean squared error (MSE) function, a fast structure similarity (FSSIM) function, and a peak signal-to-noise ratio (PSNR) function.

The controller 150 may transmit the panorama image 80 to the display 170.

FIGS. 9 through 13 illustrate examples of a result of which a parallax minimization stitching apparatus performs stitching (or combining) a plurality of images.

Figure 9:
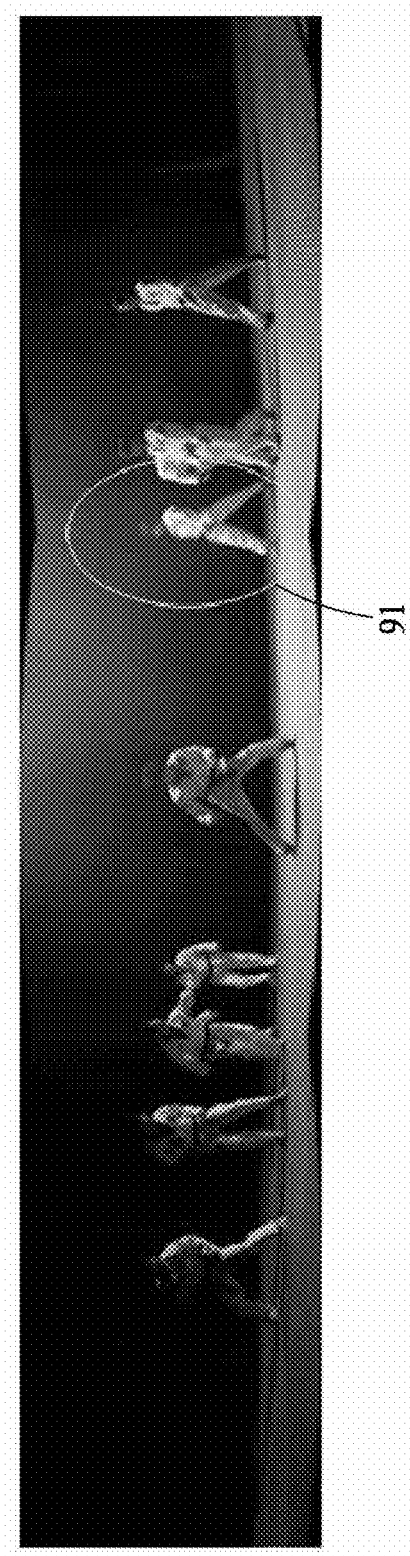
FIG. 9 illustrates a result of which a controller performs a first geometric correction on a plurality of images according to an example embodiment.
Figure 10:
FIG. 10 illustrates a parallax caused in an overlapping region when a controller performs a first geometric correction on a plurality of images according to an example embodiment.
Figure 11:
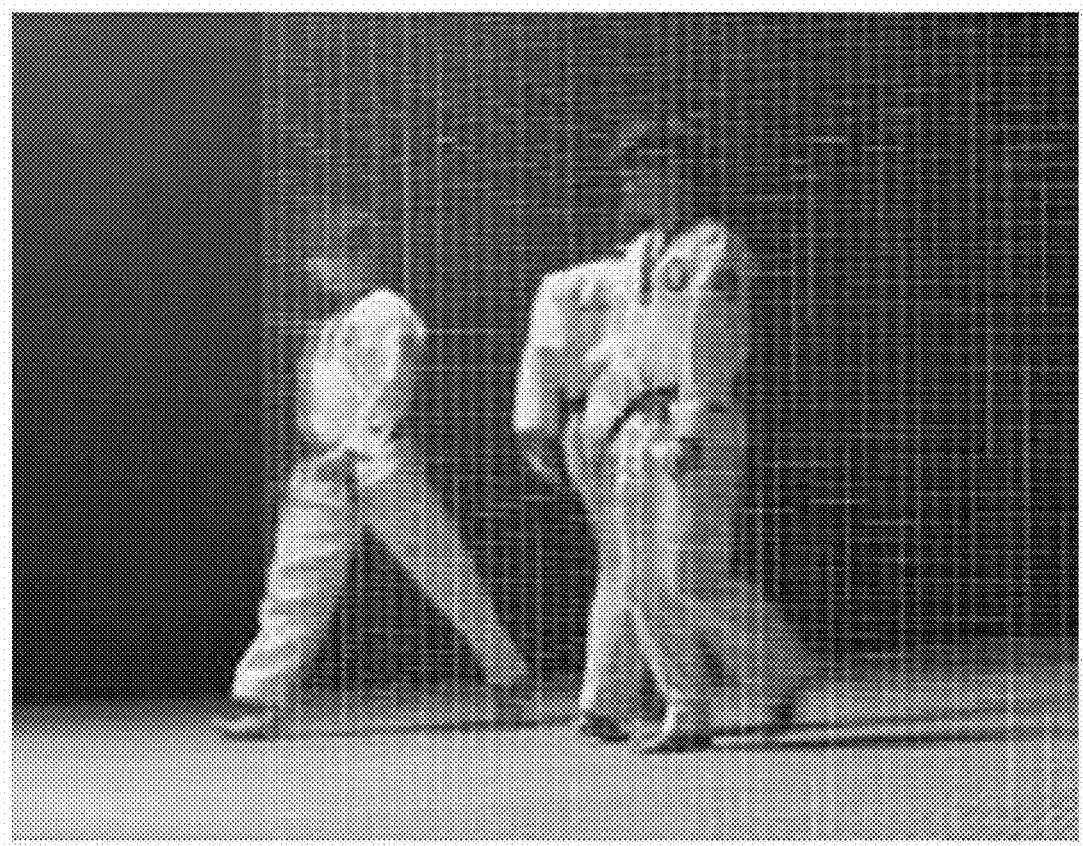
FIG. 11 illustrates an operation of defining a plurality of control points by a controller according to an example embodiment.
Figure 12:
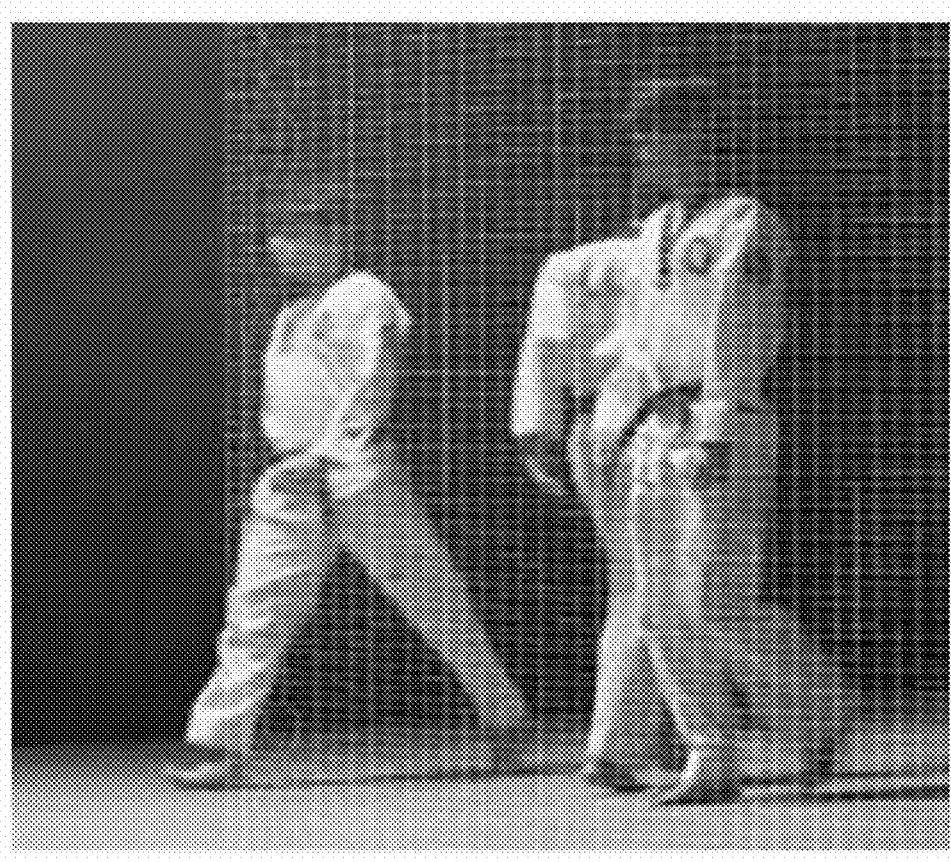
FIG. 12 illustrates an operation of performing a second geometric correction by a controller according to an example embodiment.
Figure 13:
FIG. 13 illustrates a result of which a controller performs a first geometric correction and a second geometric correction on a plurality of control points in an overlapping region according to another example embodiment.

FIG. 9 illustrates a result of which a controller performs a first geometric correction on a plurality of images according to an example embodiment, FIG. 10 illustrates a parallax caused in an overlapping region when a controller performs a first geometric correction on a plurality of images according to an example embodiment, FIG. 11 illustrates an operation of defining a plurality of control points by a controller according to an example embodiment, FIG. 12 illustrates an operation of performing a second geometric correction by a controller according to an example embodiment, and FIG. 13 illustrates a result of which a controller performs a first geometric correction and a second geometric correction on a plurality of control points in an overlapping region according to another example embodiment.

Referring to FIGS. 9 through 13, the controller 150 may perform a first geometric correction on a plurality of images received by the receiver 130. The controller 150 may perform stitching (or combining) on the images as illustrated in FIG. 9. Although the controller 150 performs the first geometric correction, a parallax region 91 may be present in an overlapping region of the images. The parallax region 91 may be as shown in FIG. 10.

The controller 150 may define a plurality of control points in an overlapping region of a plurality of images to minimize a parallax, as illustrated in FIG. 11. The controller 150 may define the control points based on a preset division value.

The controller may convert coordinates of the control points based on depth information. The controller 150 may estimate depth information and a parallax based on the depth information based on at least one of homography information, information for the stitching (or combining) operation, distances and directions of matched feature points in the overlapping region, a distance and a direction of a control point in the overlapping region, alignment information of at least one object in the overlapping region, feature similarity index (FSIM) information of the overlapping region, or high frequency information structure similarity index (HFI_S-SIM) information of the overlapping region 12.

The controller 150 may generate a panorama image by defining a plurality of patches based on the control points and performing a second geometric correction by mapping the patches. Here, the controller 150 may map the patches based on a cost function. The cost function may be one of a correlation function, a mean squared error (MSE) function, a fast structure similarity (FSSIM) function, and a peak signal-to-noise ratio (PSNR) function. A result of which the controller 150 converts coordinates of the control points based on the depth information is as illustrated in FIG. 12 and thus, a parallax may be minimized as illustrated in FIG. 13.

The controller 150 may transmit the panorama image of which the parallax is minimized to the display 170.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A parallax minimization stitching method, the method comprising:
    defining a plurality of control points in an overlapping region of a first image and a second image received from a plurality of cameras;
    performing a first geometric correction by applying a homography to the control points;
    converting coordinates of the control points on which the first geometric correction is performed based on depth information;
    defining a plurality of patches based on the control points; and
    performing a second geometric correction by mapping the patches
    wherein the converting of the coordinates comprises:
    verifying whether the control points correspond to a short distance or a long distance based on the depth information; and
    adjusting the distance between the plurality of control points according to the verifying.

2. The method of claim 1, wherein the performing of the second geometric correction comprises mapping the patches based on a cost function.

3. The method of claim 2, wherein the cost function is one of a correlation function, a mean squared error (MSE) function, a fast structure similarity (FSSIM) function, and a peak signal-to-noise ratio (PSNR) function.

4. The method of claim 1, wherein the converting of the coordinates comprises calculating the depth information based on at least one of distances and directions of matched feature points among a plurality of feature points included in the overlapping region, a distance and a direction of a control point included in the overlapping region, alignment information of at least one object, feature similarity index (FSIM) information of the overlapping region, or high frequency information structure similarity index (HFI_SSIM) information of the overlapping region.

5. The method of claim 1, wherein the adjusting comprises:
    lengthening a distance between control points corresponding to the short distance; and
    shortening a distance between control points corresponding to the long distance.

6. The method of claim 1, further comprising: updating coordinates of the control points to a look-up table (LUT) based on the first geometric correction or the second geometric correction.

7. A parallax minimization stitching apparatus, comprising:
    a receiver configured to receive a first image and a second image from a plurality of cameras; and
    a controller configured to define a plurality of control points in an overlapping region of the first image and the second image, perform a first geometric correction by applying a homography to the control points, convert coordinates of the control points on which the first geometric correction is performed based on depth information, define a plurality of patches based on the control points, perform a second geometric correction by mapping the patches, verify whether the control points correspond to a short distance or a long distance based on the depth information, and adjust the distance between the plurality of control points according to the verifying.

8. The parallax minimization stitching apparatus of claim 7, wherein the controller is configured to map the patches based on a cost function.

9. The parallax minimization stitching apparatus of claim 8, wherein the cost function is one of a correlation function, a mean squared error (MSE) function, a fast structure similarity (FSSIM) function, and a peak signal-to-noise ratio (PSNR) function.

10. The parallax minimization stitching apparatus of claim 7, wherein the controller is configured to calculate the depth information based on at least one of distances and directions of matched feature points among a plurality of feature points included in the overlapping region, a distance and a direction of a control point included in the overlapping region, alignment information of at least one object, feature similarity index (FSIM) information of the overlapping region, or high frequency information structure similarity index (HFI_SSIM) information of the overlapping region.

11. The parallax minimization stitching apparatus of claim 7, wherein the controller is configured to verify whether the control points correspond to a short distance or a long distance based on the depth information, lengthen a distance between control points corresponding to the short distance, and shorten a distance between feature points corresponding to the long distance.

12. The parallax minimization stitching apparatus of claim 7, wherein the controller is configured to update coordinates of the control points to a look-up table (LUT) based on the first geometric correction or the second geometric correction.

* * * * *